United States Patent [19]

Nomura et al.

[11] 4,274,081
[45] Jun. 16, 1981

[54] DATA INPUT APPARATUS

[75] Inventors: Nobutaka Nomura, Hadano; Hiroshi Kido, Hiratsuka; Kazunari Yamada, Hadano, all of Japan

[73] Assignee: Hitachi, Ltd., Tokyo, Japan

[21] Appl. No.: 64,507

[22] Filed: Aug. 7, 1979

[30] Foreign Application Priority Data

Aug. 11, 1978 [JP] Japan .................................. 53-97201

[51] Int. Cl.³ .............................................. G06F 3/14
[52] U.S. Cl. .............................. 340/153; 340/365 VL; 340/709
[58] Field of Search ................. 340/153, 365 VL, 709

[56] References Cited

U.S. PATENT DOCUMENTS

| | | | |
|---|---|---|---|
| 3,200,375 | 8/1965 | Lutz | 340/365 VL |
| 3,394,368 | 7/1968 | Carr | 340/365 |
| 4,028,695 | 6/1977 | Saich | 340/709 |
| 4,101,879 | 7/1978 | Kawaji | 340/709 |
| 4,118,695 | 10/1978 | Ogawa | 340/709 |

Primary Examiner—Harold I. Pitts
Attorney, Agent, or Firm—Craig & Antonelli

[57] ABSTRACT

A data input apparatus comprises a display device for displaying guidance information which designates types of data to be inputted as well as the order therefor, a key set having a plurality of keys arrayed in a matrix and a corresponding number of mats defining the functions of the individual keys which can be imparted with new definitions by changing over the associated mats, and a circuit adapted to select and change the mats defining the keys so that the various types of data indicated by the guidance information can be inputted in the order given by the guidance information. The mats can thus be replaced by other proper ones automatically without resorting to manual operation.

21 Claims, 8 Drawing Figures

DATA INPUT APPARATUS

BACKGROUND OF THE INVENTION

The present invention relates to a data input apparatus in which guidance for data to be inputted is displayed and various types of data can be inputted in accordance with the displayed guidance information.

As a terminal unit of a computer system, a data input apparatus has been proposed through which data concerning trade names of products, names of buyers, previous booking of hotel and tickets or the like are inputted. The data input apparatus usually incorporates a function to give the operator information as to the data to be inputted.

In order to allow various types of data to be inputted, there is required an input device such as disclosed in U.S. Pat. No. 3,560,964, for example. In the case of the known input device, a plurality of key switches are provided in a matrix array and a book composed of plural types of data mats carrying special data and hinged together is disposed on the key switch array. By turning the data mats in such a manner that the pages of the book are turned over, different significances are given to the individual keys and at the same time different codes are produced. For example, when a certain page is turned over, the individual keys represent names of goods, while another page causes the individual keys to represent the names of customers. A data input apparatus disclosed in U.S. Pat. No. 3,394,368 differs from that shown in U.S. Pat. No. 3,560,964 in that the data mats are changed over by pushing a corresponding push button. In this manner, the data input apparatus of the prior art allows the definitions imparted to the individual keys to be altered to various significances, whereby a great number of various data can be inputted.

However, for inputting a number of various data, the operator is required to manually change over the data mats and thereafter depress the keys, which is of course troublesome for the operator and provides an obstacle in attaining a high operation efficiency.

SUMMARY OF THE INVENTION

An object of the invention is to provide a data input apparatus which allows the change-over of the data mats to be effected automatically without resorting to manual operation, thereby to enhance the data inputting operation efficiency.

Another object of the invention is to provide a data input apparatus in which guidance for the data to be entered is displayed and the data mat required for inputting the data is automatically selected and changed over.

Still another object of the invention is to provide a data input apparatus which gives the operator information as to which data item on the displayed guidance is to be inputted and which allows the data mats to be exchanged in accordance with the above information.

According to the present invention, there is provided a data input apparatus which comprises a display unit for displaying guidance information for designating several types of items to be inputted, an input unit comprising input means such as keys disposed in a planar array and means for giving definitions to the individual input means, and means for changing the definitions imparted to the input means in accordance with the displayed guidance, whereby the operator is required to simply select and input given data in the order designated by the guidance information.

DESCRIPTION OF THE PREFERRED EMBODIMENTS

Figure 1:
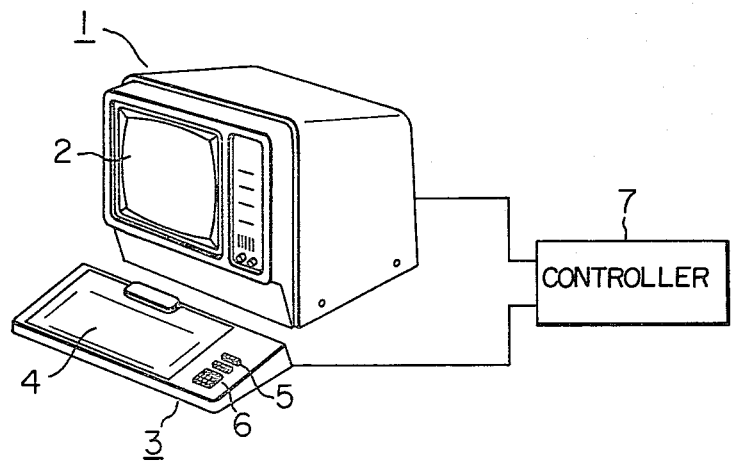
FIG. 1 is a perspective view to show a data input apparatus according to an embodiment of the invention.

FIG. 1 shows an exemplary embodiment of the present invention. In the figure, numeral 1 denotes a CRT display unit, and 3 denotes a keyboard apparatus. There is further provided a controller 7 which serves for controlling the display unit 1 and the keyboard apparatus 3 and which may be physically installed within the display unit 1. The keyboard apparatus 3 is provided with a data input field 4 including a predetermined number of keys arrayed in a matrix, guide keys 5 and function keys 6. The operator may select a guidance by depressing a given one of the guide keys, whereby the corresponding guidance information is displayed on the display screen 2. The operator may then input data in accordance with the guidance information. At that time, a data mat containing definitions for the functions of the keys belonging to the data input field 4 is changed over under control of the input unit in dependence on the type of data to be inputted.

Figure 2:
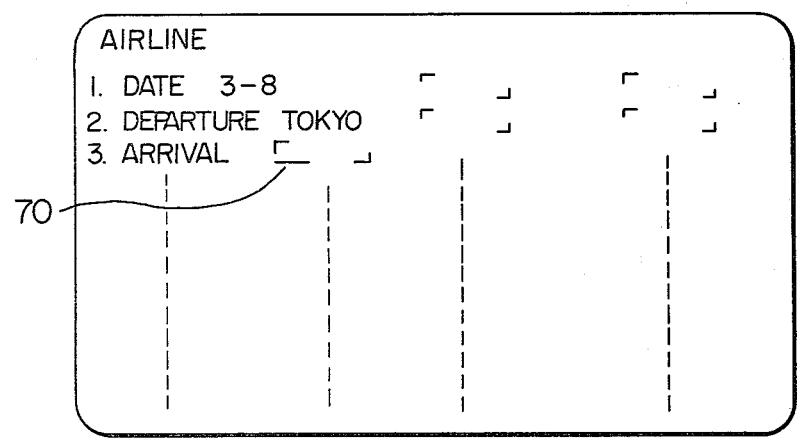
FIG. 2 illustrates guidance information displayed on a cathode ray tube (CRT) in the data input apparatus according to an embodiment of the invention.

Next, the invention will be described in conjunction with a specific example. It is assumed that the data input is executed for booking a reserved seat in an airline, railroad or the like. The guidances are prepared for the booking air line ticket, railroad ticket or the like. These guidances are stored in a storage or memory unit and a given one is selected and read out to be displayed through operation of the corresponding guide key described above. FIG. 2 shows the guidance for booking an airline ticket as displayed on the display screen. In order to get an airline ticket, it is required to input data such as embarkation date, departure airport and destination airport. These items are displayed on the display screen. The operator is informed by the guidance display that the date has to be initially inputted.

Figure 3:
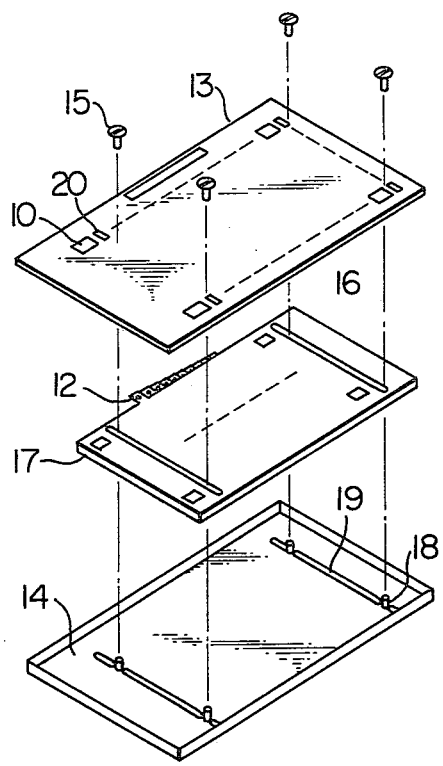
FIG. 3 shows a typical arrangement of a keyboard which may be employed according to the invention.

FIG. 3 shows in detail an arrangement of the data input unit 4. A plurality of data mats 17 are contained between a base 14 and a cover sheet 13, each of the data mats being adapted to be slidably moved in the transversal or lateral direction. A group of keys arrayed in a matrix is disposed below the base 14 which is provided with elongated holes or slots 19 through which the key tops may projects upwardly. Projections 18 serve to fixedly secure the cover sheet 13 in cooperation with set screws 15. The cover sheet 13 is provided with holes 20 through which the associated key top may project upwardly. Windows 10 are also formed in the cover sheet 13 adjacent to the respective holes 20 in association with the individual keys.

Figure 4:
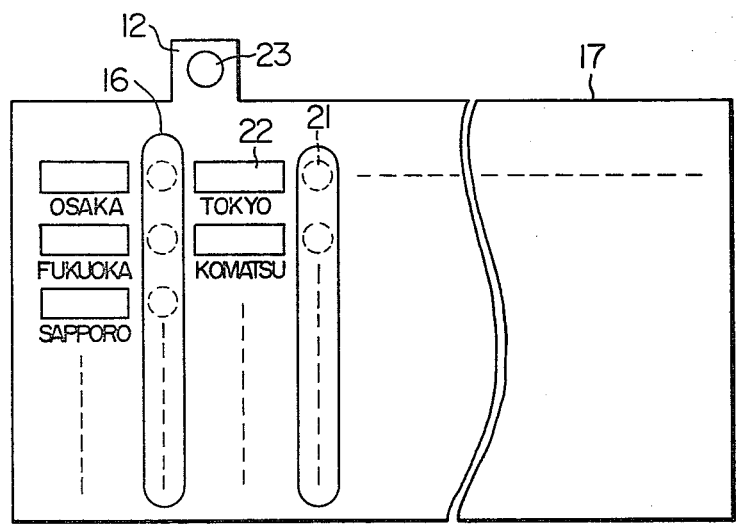
FIG. 4 shows data mats used in combination with the keyboard shown in FIG. 3.

An example of the data mat 17 is illustrated in FIG. 4. In order to permit the transversal movement of the data mat 17 (upward and downward movement as viewed in FIG. 4), slots 16 are formed in the data mat 17 at positions corresponding to the columns of the keys 21. Windows 22 are formed also in the data mat 17 at positions aligned with the windows 10 formed in the cover sheet 13 in the normal state of the data mat 17. Names of airports are marked immediately below the windows 22.

Figure 5:
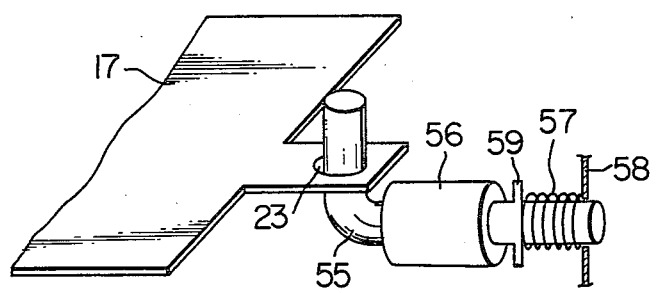
FIG. 5 shows an exemplary embodiment of a data mat driving device.

Next, an example of the device for slidably moving the data mat 17 will be described by referring to FIG. 5. The data mat 17 is provided with a projection 12 having a hole 23 formed therein. Extending through the hole 23 is a leg portion of a L-shaped pin 55 which has the other leg portion extending through a hole formed in a partition 58 of the keyboard apparatus 3. As will be readily appreciated, when a solenoid 56 is electrically energized, the L-shaped pin 55 is caused to move to the right as viewed in FIG. 5 against the force of a spring 57, whereby the data mat 17 is slidably moved. Upon deenergization of the solenoid coil 56, the data mat 17 is returned to the initial or normal position under the action of the return spring 57.

Referring to FIG. 4, when the data mat 17 is shifted in the manner described above, the names of airports marked below the windows make appearances through the windows 10 formed in the cover sheet 13. Thus, the operator can read the airports through the cover sheet 13 and input the corresponding data by depressing the associated key. It should be mentioned that some of the data mats contain the names of aviation companies, hotels or the like. These data mats are also changed over in accordance with the guidance described hereinbefore.

The change-over of the data mats 17 may be performed by a sliding device which may be installed within the keyboard apparatus 3 and arranged such that the data mat required for inputting a succeeding guide data item is selected and shifted in response to the inputting of a preceding guide data item by the operator, with the guide data items being arrayed in a predetermined order. More specifically, the guidance as displayed includes a plurality of items to be inputted in a predetermined order. Assuming that the date is the first item to be inputted, the slide device detects and selects the data mat for inputting the date item. In response to the inputting of the date item, the slide device selects and slides the data mat required for inputting the name of departure airport. The codes which are made use of for the mat selecting operations described above may be stored in combination with the associated items to be selected and inputted or alternatively stored in a form of a separate table in such a manner that the mat identifying codes may be read out sequentially from the top of the table.

In the case of the exemplary embodiment of the invention described below, it is assumed that a CRT is employed for the display, wherein the position at which the data is to be inputted is indicated by a cursor, while the selection of the data mat is made in response to the address of the cursor. Further, it is assumed that there are provided plural types of guidances each containing a plurality of items to be inputted and that a desired guidance is selected by actuating the associated key of the keyboard apparatus.

Figure 6:
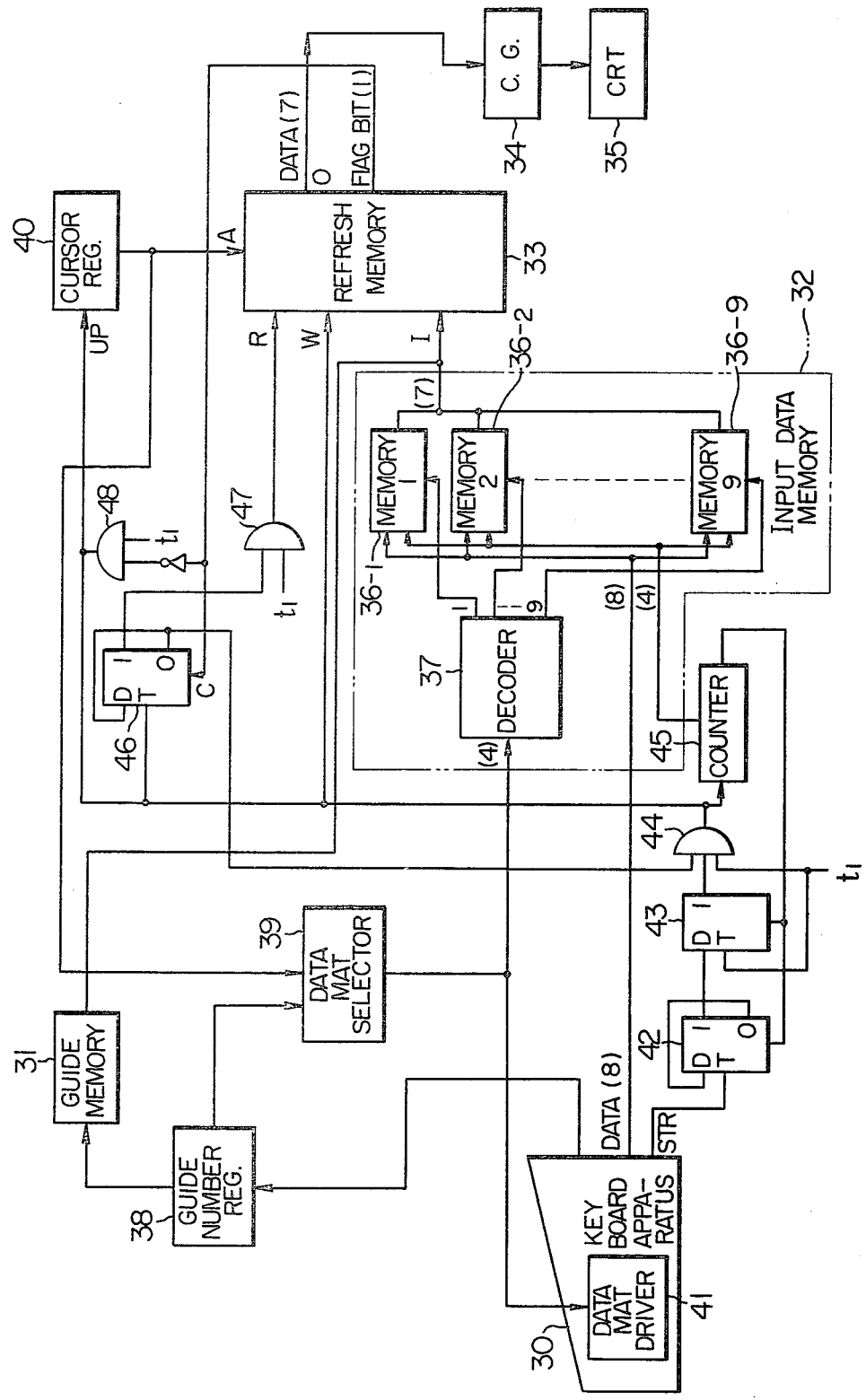
FIG. 6 shows in a block diagram an electric system of the data input apparatus according to an embodiment of the invention.

FIG. 6 shows an arrangement of a data input unit according to an embodiment of the invention. The keyboard apparatus or key set 30 is capable of inputting various types of data by changing over the data mats in the manner described above and incorporates the guide keys (FIGS. 1 and 5) for selectively designating the desired one from the plural guidances. A guide memory 31 serves to store therein a plurality of guidances a typical one of which is exemplified in FIG. 2. An input data memory 32 functions to generate a code representing a character from the code input through the keyboard or key set 30. The generated code is then loaded into a refresh memory 33. The input data memory 32 includes nine memories 36-1 to 36-9. This number (9) is equal to the number of the data mats which can be changed over by means of the keyboard apparatus 30. The individual memories 36 contain therein character codes representing the items entered from the associated data mats. A decoder 37 receives a four-bit code for selectively designating one of the data mats and selects one of the memories 36 which is identified by the received code. In the case of the illustrated embodiment, it is assumed that each of the memories 36 is imparted with an area to store sixteen characters at maximum for every item. For example, an item "TOKYO" consists of five characters. The memory 36 is capable of storing such characters up to sixteen. The refresh memory 33 is adapted to store the guidance information read out from the guide memory 31 under designation of the guide keys 5. The refresh memory 33 has a capacity for storing character codes for a single display. The codes are sequentially read out to be converted into a character pattern through a character generator 34, and displayed on the CRT display unit 35. When all the required data has been stored in the refresh memory, the stored contents will be then transferred to a central unit.

Next, description will be made of the operation of the data input unit. When a guide key of the key set 30 is depressed, the guide number corresponding to the depressed key is outputted and stored in a guide number register 38 which will then select one of the guidances contained in the guide memory 31. Further, the guide number is supplied to a data mat selector 39. It should be mentioned that the refresh memory 33 is provided with a cursor register 40 for designating the position at which the cursor mark is to be written. The guidance stored in the guide memory 31 comprises a combination of character codes. The codes for a single character is constituted by a seven-bit code representing the type of character and a single-bit flag which indicates a position (write-in field) at which data is to be written in. The cursor mark 70 is displayed only at the position in which the flag is a logical "1".

It is assumed that the cursor mark is indicated at the position at which the initial data is to be entered. The data mat selector 39 will then produce a signal commanding which data mat is to be selected in dependence on the contents in the guide number register 38 and the cursor register 40. The command signal is supplied to the data mat driver 41 for extracting slidably the relevant data mat and also is supplied to the decoder 37.

When a given key is depressed by the operator, data (eight bits) indicating which key has been depressed is supplied to the memories 36 one of which is validated under the selection by the decoder 37. Further, depression of the key sets a signal STR to a high level, resulting in flip-flop 42 being set and a logic "1" is stored in flip-flop 43. A hexadecimal counter 45 having a four-bit capacity is initialized at "0". Consequently, the character code corresponding to a first character is read out from the area for an item of the memory 36 designated by the eight-bit data described above. A flip-flop 46 is in the logic "0" state. An AND gate 44 is enabled upon application of a timing signal $t_1$ thereby to update the contents of the counter 45 by one and at the same time supply a write command to the refresh memory 33 which will then write therein the character code as read out as described above at an address designated by the cursor register 40.

Further, the flip-flop 46 is triggered to the set state while the cursor register 40 is updated by one. Then, an AND gate 47 is enabled by the timing signal $t_1$ to supply a read-out command to the refresh memory 33. It should be noted that the timing signal or pulse $t_1$ is produced repeatedly at a predetermined time interval. In accordance with the read-out command, information about the succeeding character position prepared by the cursor register 40 is read out. When the field flag is logic "1" at that time, the flip-flop 46 is reset and remains in this state until the AND gate 44 has been opened again by the succeeding timing pulse $t_1$, whereupon the next character code is read out and written in the refresh memory 33 through the processes described above. When the counter 45 is filled up after the character codes for sixteen characters have been read out, an over-flow signal is produced from the counter 45 to reset the flip-flops 42 and 43. Through the operation described so far, a single item has been inputted.

On the other hand, when a single write-in field containing data corresponding to sixteen characters has been passed over, the flip-flop 46 can never be reset, because the next write-at field flag is in logic "0". Accordingly, so far as the write-in flag is in the "0" state, the read-out command continues to be produced at the timing of the signal $t_1$. Further, the AND gate 48 is enabled for each timing pulse $t_1$ to update the cursor register 40. Thus, the cursor register 40 continues to be successively updated so long as the field flag is in the "0" state. The updating operation stops at the first character position of the write-in field for the succeeding row in the case of the exemplary display shown in FIG. 2, since the write-in flag will then become logic "1" to reset the flip-flop 46.

The data mat selector 39 produces a signal for selecting a fresh data mat in dependence on the current contents placed in the cursor register 40 and the guide number register 38. In a similar manner, data inputting is executed in accordance with the guidance. When the data input operation for a certain guidance has been completed, the operator is permitted to depress a given guide key to repeat the operations described above. The use of a hexadecimal counter for the counter 45 as well as the dimension of the single-item area of the memories 36 for sixteen characters are based on the presumption that all the items will be expressed by less than seventeen characters. The capacity of the counter 45 and the dimension of the memory area may be selectively changed in dependence on the lengths of items to be inputted.

Of course, the input member or entry means is not restricted to the key of the keyboard or key set 30 but may be constituted by contactless switches of the type in which variation in an electrostatic capacitance is made use of.

Further, the data mat may be implemented in the form of a movable continuous film-like strip instead of the sheet stack as in the case of the illustrated embodiment.

Figure 7:
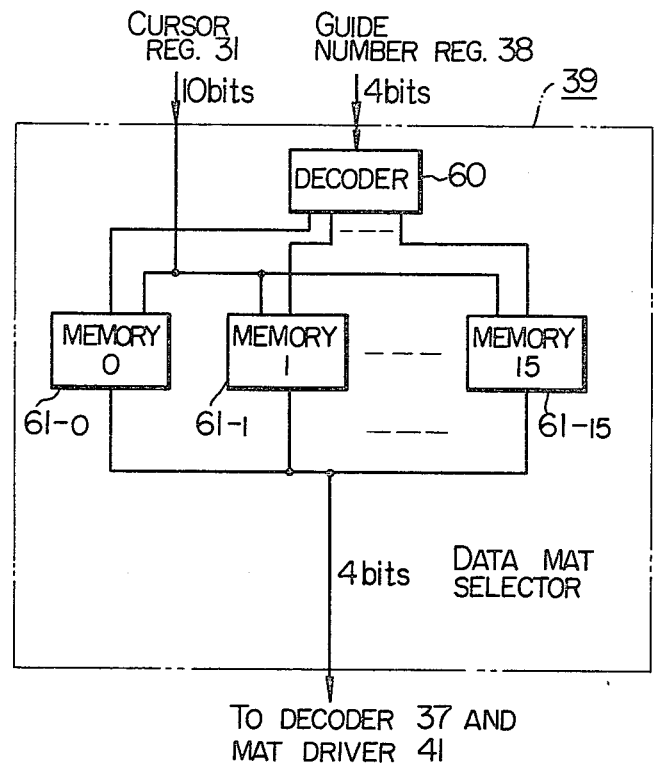
FIG. 7 is a circuit diagram showing details of a data mat selector employed in the system shown in FIG. 6.

Now, referring to FIG. 7, the data mat selector according to an embodiment of the invention will be described in detail. In FIG. 7, reference numeral 61 denotes a memory which is provided in number corresponding to that of the guidances and stores therein information as to which data mat should be selected at a predetermined position of the cursor relative to the guidance. Since it is assumed that the number of guidances is equal to sixteen in the case of the embodiment now being described, sixteen memories 61-0 to 61-15 are provided. The guide number register 38 supplies four-bit data to a decoder 60 which will then select the corresponding one of the sixteen memories 61. On the other hand, the significant bits except for the least significant four bits of the cursor register 40 are used as the read-out address for the selected memory 61. The reason why the least significant four bits are excluded is explained as follows. As described before, a memory area for an item consists of sixteen character areas, and a cursor address designates a single character area. Accordingly, the least significant four bits are useless to designate the memory area for an item.

A four-bit code for selecting the data mat is read out from the memory 61 selected by the address bits from the cursor register 4.

Figure 8:
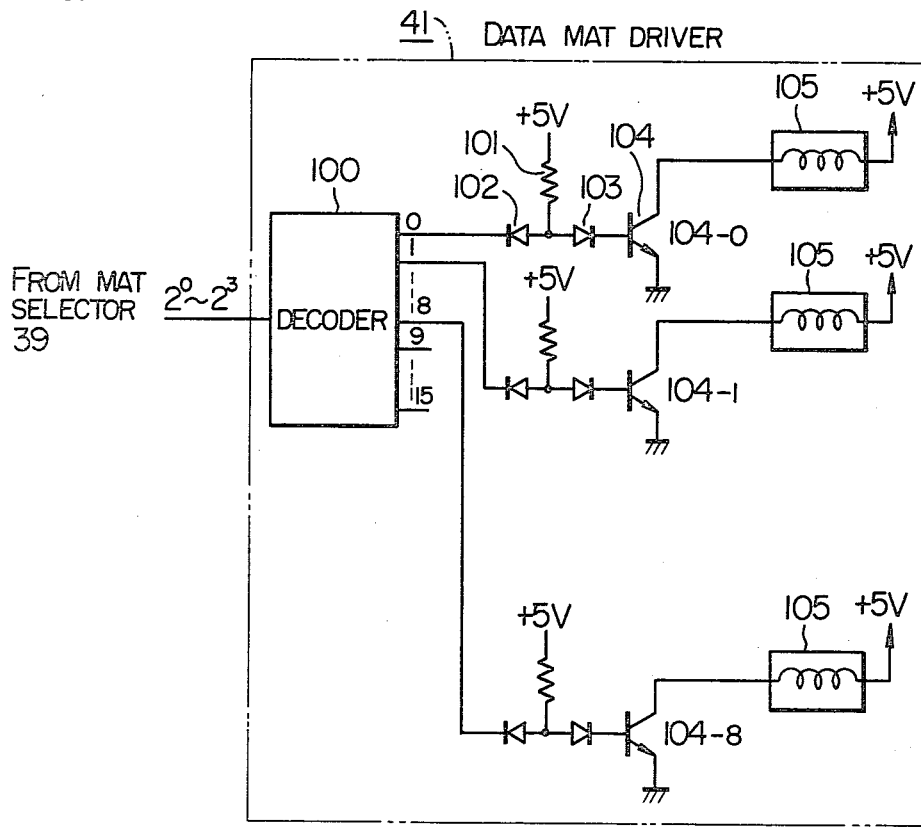
FIG. 8 is a circuit diagram showing details of a data mat driver employed in the system shown in FIG. 6.

Next, referring to FIG. 8, description will be made of the data mat driver 41. A decoder 100 receives the four-bit data from the data mat selector 39, as the result of which one of nine inputs 0, 1, ..., 9 thereof rises up to a high voltage level. Numeral 105 denotes coils each corresponding to the solenoid 56 shown in FIG. 5. The coils 105 are provided in number corresponding to that of the data mats. One end of the individual coil 105 is connected to a positive potential source, while the other end thereof is connected to a collector of a transistor 104 which has an emitter grounded to earth potential and a base connected to the cathode of a diode 103. The anode of the diode 103 is connected to the anode of a diode 102, the common junction being connected to the positive potential source through a resistor 101. The cathode of the diode 102 is connected to the output of a decoder 100. When the output of the decoder 100 is at a low level, a current will flow through the resistor 101 and the diode 102 to turn off the transistor 104. On the other hand, when the output from the decoder 100 is at a high level, a base current flows to the transistor 104 through the diode 103 thereby to turn on the transistor 104, resulting in the current flow through the coil 105.

In this manner, the data mat driver electrically energizes the solenoid 105 corresponding to the selected data mat thereby to slide the latter.

As described hereinbefore, the data mat stack may be replaced by a continuous film-like strip. When such continuous data strip is employed in combination with the contactless switches operative in response to variation in electrostatic capacitance instead of the keys, it is preferred to define the functions of the contactless switches on the data strip film which may be wound up by a take-off reel or moved in an endless belt-like manner. The data mat stack may possibly involve degradation in the sensitivity of the key switches when the key top is at the retracted position.

As will be appreciated from the foregoing description, the data input apparatus according to the invention allows the operator to execute the data inputting operation while observing the guidance, whereby the operation efficiency can be improved without incurring any errors. Further, since the definition of the keys for the group of items as required for inputting the guided items can be changed over without resorting to manual operation, the data inputting procedure can be significantly facilitated.

In particular, the arrangement such that the cursor is displayed on the display unit at the position at which next data is to be inputted thereby to designate the type of the next input item and that the data mat or film carrying definitions of the keys or the like input switches is moved in accordance with the current address of the cursor, the operating efficiency can be further enhanced.

We claim:

1. A data input apparatus for inputting various types of data comprising:
    display means for displaying a selected one of a plurality of types of guidance information representative of different types of data to be inputted and the order in which the data is to be inputted, said display means including cursor means for designating an area corresponding to a part of said displayed information into which data is to be inputted;
    an input device including a plurality of data entry means and definition determining means having a plurality of definitions for each of said entry means for providing each of said entry means with a selected one of said definitions; and
    selection means coupled to said definition determining means for selecting one of said definitions for said entry means in response to the area designated by said cursor means and the type of guidance information selected.

2. The data input apparatus according to claim 1, which further comprises memory means storing a plurality of types of guidance information to be displayed, said input device further comprising guidance selecting means for selecting one of said types of guidance information stored in said memory means to be displayed and means for applying the selected guidance information to said display means.

3. The data input apparatus according to claim 1, wherein said display means includes a cathode ray tube display, said cursor means including means for designating successive input areas in which input data is to be inputted in said display according to said guidance information.

4. The data input apparatus according to claim 1, further including refresh memory means in which input data entered by said input device to be displayed by said display means is stored in overlapping relation with said guidance information.

5. The data input apparatus according to claim 4, wherein said guidance information includes codes of characters representative of types of data to be inputted and cursor information designating input areas in which input data is to be inputted, said display means including a cathode ray tube display and said cursor means including means for generating a cursor mark designating an input area according to said cursor information.

6. The data input apparatus according to claim 5 wherein said selection means is responsive to said cursor information.

7. The data input apparatus according to claim 2 wherein input data entered by said input device is indicated on said display means in overlapping relation with said guidance information.

8. The data input apparatus according to claim 7, wherein said guidance information includes codes of characters representative of types of data to be inputted and cursor information designating input areas in which input data is to be shown,
    said display means including a cathode ray tube display and, said cursor means indicating a cursor mark designating an input area according to said cursor information.

9. The data input apparatus according to claim 8, wherein said selection means is responsive to said cursor information and the output of said guidance selecting means.

10. The data input apparatus according to claim 5 or 8, wherein the input data entered by said input device is indicated at a location on said display means where said cursor mark is indicated.

11. The data input apparatus according to claim 6, wherein said selection means includes a selector memory which stores selection information designating one of said definitions for each of said input areas, and outputs the selection information in accordance with the location of said cursor mark.

12. The data input apparatus according to claim 9 wherein said selection means includes a plurality of selector memories, each of which stores selection information designating one of said definitions for each of said input areas, and outputs the selection information in accordance to the location of said cursor mark,
    said selector memories being selected in response to the output of said guidance selecting means.

13. A data input apparatus for inputting various types of data comprising:
    guide memory means for storing a plurality of types of guidance information representative of different types of data to be inputted, each type of guidance information including at least one area into which data is to be inputted;
    display means for displaying a selected one of said plurality of types of guidance information stored in said guide memory means, including cursor means for designating the area of said guidance information into which data is to be inputted;
    an input device including a plurality of first data entry means for designating a selected one of said plurality of types of guidance information to be transmitted from said guide memory means to said display means and a plurality of record data entry means, each capable of representing one of a plurality of different definitions depending on the type of guidance information selected, for designating the data to be inputted into said area of the selected guidance information;
    definition determining means for storing plural sets of data representing the plural definitions associated with said second data entry means;
    selector means responsive to a selected first data entry means and the area designation provided by said cursor means for enabling one of said sets of data to be applied to said display means; and
    timing control means responsive to a selected second data entry means for applying data representing a given definition from the set of data enabled by said selector means to said display means along with the selected guidance information from said guide memory means.

14. A data input apparatus as defined in claim 13, wherein each type of guidance information includes a plurality of areas into which data is to be inputted and wherein said cursor means includes means responsive to said timing control means for sequentially designating the areas in said guidance information as data is inputted into said areas in succession with operation of said second data entry means.

15. A data input apparatus as defined in claims 13 or 14, wherein said display means includes refresh memory means responsive to said timing control means for storing the selected guidance information from said guide memory means and the data from the enabled set in said definition determining means selected by said second data entry means, and means for displaying the data and information stored in said refresh memory means.

16. A data input apparatus as defined in claim 13, wherein said definition determining means comprises a plurality of input data memories each storing a different set of definitions associated with said plurality of second data entry means and decoder means responsive to the output of said selector means for enabling the contents of a selected input data memory to be read out to said display means.

17. A data input apparatus as defined in claim 16, wherein each type of guidance information includes a plurality of areas into which data is to be inputted, said areas in the guidance information being indicated by a flag, and wherein said timing control means includes means responsive to detection of the flags in said guidance information for driving said cursor means to sequentially designate said areas in the guidance information as data is inputted into said areas in succession with operation of said second data entry means.

18. A data input apparatus as defined in claim 17, wherein said input device further includes register means for storing the identity of a selected first data entry means, and wherein said selector means includes means for enabling one of said input data memories on the basis of the identity stored in said register means and the designation provided by said cursor means.

19. A data input apparatus as defined in claim 18, wherein said selector means includes a plurality of selection memories, each storing the addresses of said input data memories in locations corresponding to the positions of the data input areas in a respective guidance information and further decoder means responsive to the identity of a first data entry means stored in said register means for enabling one of said selection memories, said selection memories being addressed by the output of said cursor means.

20. A data input apparatus as defined in claims 13 or 19, further including a plurality of data mats each carrying indicia representing a respective set of said definitions and each mat being movable between a first position where the indicia thereon is not visible to a second position where the indicia thereon appears visibly in the vicinity of said plurality of second data entry means, and means responsive to said selector means for moving a data mat corresponding to a selected set of definitions from said first to said second position.

21. A data input apparatus as defined in claim 13, wherein said display means includes a cathode ray tube display.

* * * * *